Aug. 19, 1930. P. S. SHIELD 1,773,692
MOUNTING OF VEHICLE BODIES
Filed Feb. 23, 1928 2 Sheets-Sheet 2
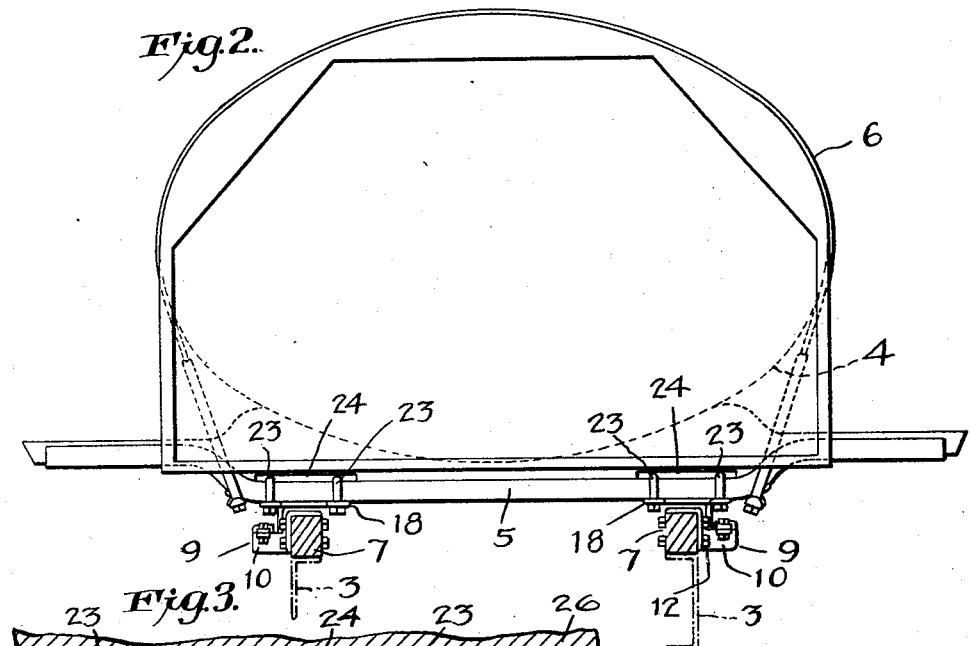
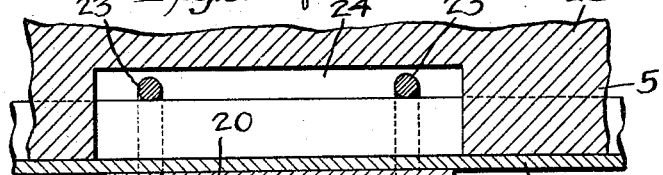
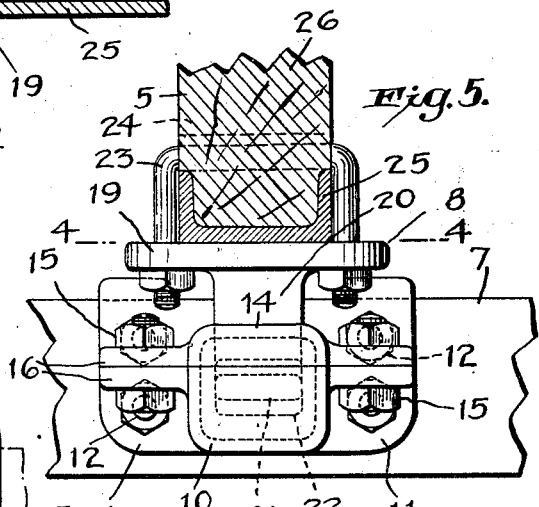
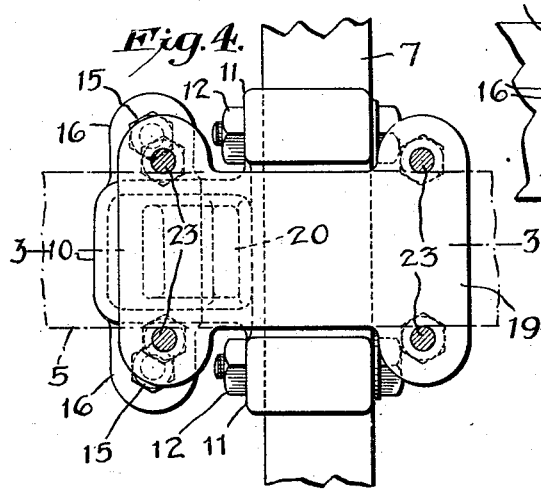
Paul S. Shield INVENTOR
BY
ATTORNEY Patented Aug. 19, 1930

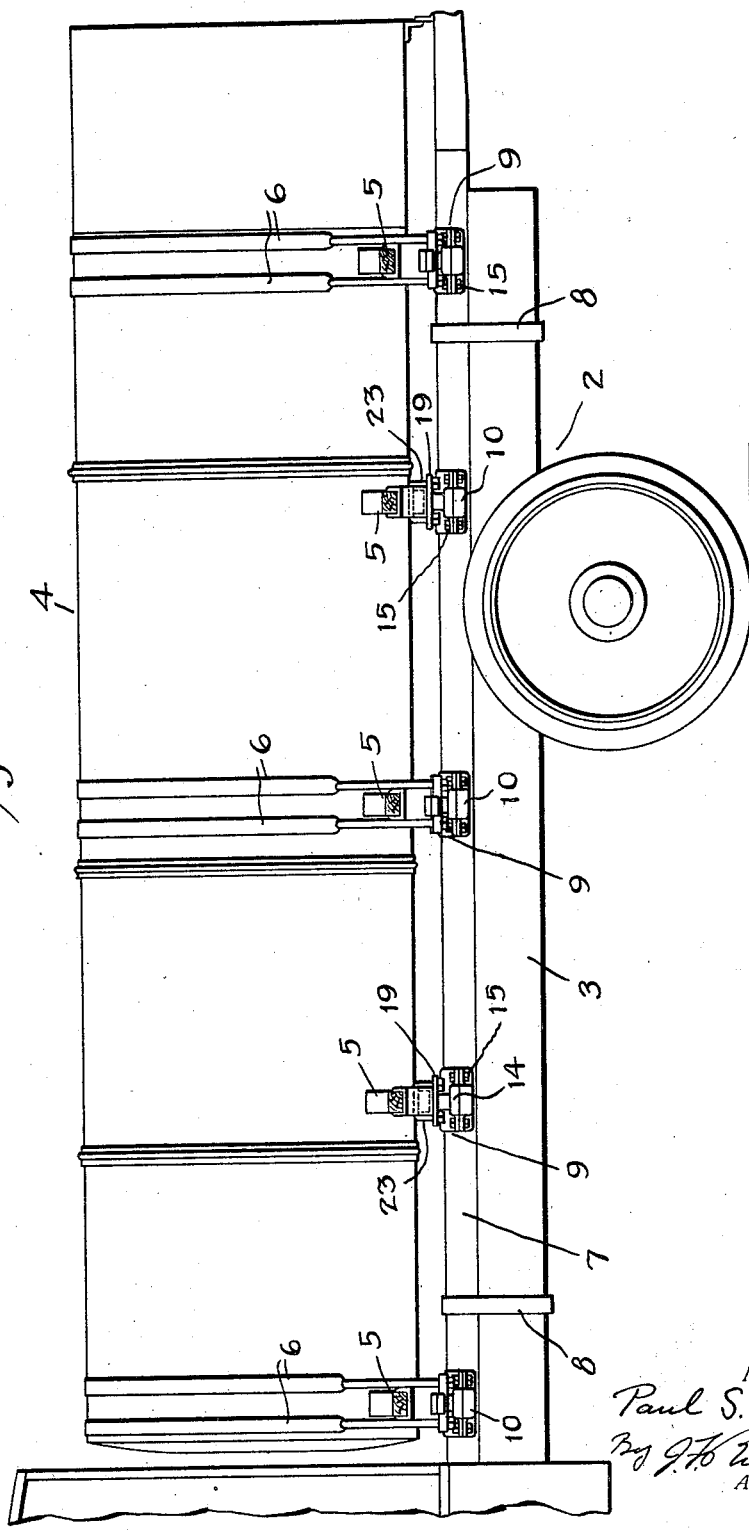

1,773,692

UNITED STATES PATENT OFFICE

PAUL S. SHIELD, OF CINCINNATI, OHIO, ASSIGNOR TO AUGUSTINE DAVIS, JR., OF CINCINNATI, OHIO

MOUNTING OF VEHICLE BODIES

Application filed February 23, 1928. Serial No. 256,168.

The object of the invention relates to vehicle body mountings, and more particularly, though not necessarily exclusively, to the mounting of tank bodies on tank trucks.

It is known to place between the longitudinal sills of the under frame or mounting of a truck tank and the sills of the vehicle frame, cushion shock absorbing devices comprising molded rubber blocks held in housings on the sills of the chassis and engaged by members projecting from the mounting sills, the purpose being to afford protection to these tank bodies from vibration and other road shocks, and thereby to secure longer life for both the tank and the truck. In such a plan, the sills and bolsters of the tank body and under frame being solidly fixed to each other, the tank is still subject to stresses and strains set up in this frame or mounting, for example, twisting strains, communicated from the vehicle frame to the body mounting through the cushion connections, which, as heretofore applied, could have only a limited capacity for taking up such strains.

One of the objects of this invention is to secure equal or better advantages than have heretofore been obtainable from such cushioning devices in connection with bodies, and in addition to very greatly reduce the effect of twisting strains on the tank or other vehicle body. In the preferred embodiment of the invention this is accomplished by incorporating the cushion supporting devices within the limits of the mounting or under-frame of the body itself, by interposing these devices between the sills and bolsters of this frame. The body or tank bolsters are preferably individually supported on the cushion devices. By having the bolsters and their cushion supports numerous enough and distributed at short enough intervals along the two sides of the body, the body or tank is given adequate support against the stresses set up by its load, which in the case of a tank body are especially severe because of surging. A tank thus supported is well able to withstand stresses both external and internal.

Another advantage of incorporating the devices in the under-frame of the body is that a shock-absorbing body can be made and shipped complete in readiness to be attached to a chassis by ordinary simple methods of connection, instead of requiring the installation of the shock-absorbing cushions to be made a special and rather expensive operation at the time of putting the body on the chassis. Consequently, this embodiment of the invention permits of more general use of body-supporting shock-absorbers, which particularly in tank trucks, are not only economical in the long run, but are important for reasons of safety. Even though the chassis and body should be made or assembled by one manufacturer, which is commonly not the case, it is easier and less expensive to install the shock-absorbing devices when the tank and and the mounting are put together, rather than when the heavy body is being mounted on the chassis.

Other aspects, features and possible applications of the invention falling within the scope of the appended claims will be apparent to those skilled in the art.

In the accompanying drawings forming part hereof:

Fig. 1 is a side elevation of a tank truck illustrating an application of the invention, the forward part of the vehicle being broken away;

Fig. 2 is an end view of the body with the sills of the mounting in section, the sills of a chassis being represented in broken lines;

Fig. 3 is a vertical section on the line 3—3 of Fig. 4;

Fig. 4 is a sectional plan view of portions of a bolster and sill of the mounting showing one of the connections, the section being taken on the line 4—4 of Fig. 5; and Fig. 5 is a side elevation of the parts seen in Figs. 3 and 4, the bolster being in section.

The numeral 2 designates the truck chassis and 3 the longitudinal sills thereof. A tank, of a kind commonly used for transporting inflammable and volatile liquids, is marked 4.

This tank is shown provided with a mounting comprising a sufficient number of transverse cradle bolsters 5, to which the tank is secured by straps 6, and longitudinal sills 7, which are placed directly on top of the sills 3 of the vehicle frame and secured to them by suitable clips or connections 8.

The bolsters 5 overlie the sills 7 but do not rest thereon directly, the under sides of the bolsters and their attachments being spaced from the tops of the sills and their attachments. At each and every crossing between these bolsters and sills there is a cushion supporting and connecting device 9.

Each of these devices comprises a housing or receptacle 10 having vertical flanges 11 bolted at 12 to the outer side of the corresponding sill, the housing firmly holding a molded solid elastic rubber block 13, which may be confined under compression. Each housing has a cap 14, which is connected to the lower part of the housing by bolts 15 passing through flanges 16, and which has an opening 17 in the top, adjacent the sill.

The other part of each of the cushioning connections includes a fitting 18 secured to the bolster, there being two of these fittings on intermediate portions of each bolster, spaced apart at opposite sides of the center at a proper distance to cooperate with the housings and rubber blocks on the sills. Each of these fittings 18 is seen to consist of a plate 19 applied to the bottom of the bolster, and formed at its outer portion with a broad depending integral limb 20. This limb passes downward at the outer side of the corresponding sill 7, and spaced therefrom and from the walls of the corresponding housing 10, through the top opening 17 into the interior of the housing, where it has a laterally out-turned portion 21 provided with a head 22 which is enlarged in the vertical direction. Each of the rubber blocks 13 is molded with a recess to receive the shank and laterally turned portion of the corresponding limb, the thickness of the block above and below the laterally turned portion and to right and left of the head 22 being such as to sustain cushioningly all stresses operating between the sills and the bolsters carrying the weight of the body and its load.

The plates 19 are clamped to the bolsters 5 by U-bolts 23 passing through longitudinal slots 24 in the bolsters, the length of slots being such as to enable the two fittings 18 of each bolster to be set at different distances apart, which in turn enables the sills 7 to be disposed nearer together or farther apart, to correspond to the distance between the chassis sills 3, which varies in different trucks. Universal mountings are already known, but the universal feature is here combined with a plan of shock-absorbing body support, with the same fittings serving for both purposes. The invention is not limited in this respect to the precise construction shown, since the fittings may be secured to the bolsters by adjustable slot and clamp connections of specifically different forms.

The bolsters are shown of the type composed of metal channels 25 and wood filler blocks 26, but this form of construction is not essential.

From the foregoing description it will be evident that each body bolster is supported at two points on connections capable of sustaining and cushioning stresses and relative movemens in all directions, and that each bolster is preferably supported in this manner independently of every other bolster, so that, for example, when the horizontal plane through the sills is warped by twisting or weaving due to road shocks and the action of the spring suspension of the chassis, all of the cushioning devices can respond in different degrees so as to save the tank or body proper as far as possible from injurious strain. It follows that the points of cushion support must be numerous enough and so distributed along the length of the body as to give the tank or body, acting as a loaded beam, adequate support. In a tank of the length illustrated there may be five bolsters, one near each end of the tank and the others equally spaced between, with ten cushion connections all together between the bolsters and the sills, but naturally the number of bolsters and cushion connections required will depend upon the length and size of the tank.

While the invention thus contemplates more especially the supporting of all the tank or body bolsters on cushion connections, advantages of the invention may be realized to a certain extent by supporting one or more of the bolsters in this way.

The invention has special functions and advantages in tank bodies, and is specifically claimed therein, but applications to other bodies are not excluded. For instance, gasoline is also carried in drums on stake bodies, in which the conditions and the safety problem are similar in a measure to those present in tank bodies.

In the illustrated embodiment the bolsters are not shown connected with each other except by the body itself, and except for their flexible connections with the sills, but it will be appreciated that there may be other connections for tying the bolsters together or more or less firmly uniting them with each other, such provisions being known.

Reversal of the parts of the cushioned connections with reference to the bolsters and sills is permissible.

I claim:

1. A body mounting adapted to be mounted on the frame of a vehicle, said mounting comprising transverse bolsters carrying the body, and longitudinal sills, in combination with cushion connections interposed between said bolsters and sills, said connections comprising housings applied to said sills and holding blocks of cushion material, and members applied to said bolsters and engaged with said blocks so as to secure cushioned support against stresses up and down and laterally.

2. A body mounting adapted to be mounted on the frame of a vehicle, said mounting comprising transverse bolsters carrying the body, and longitudinal sills, in combination with cushion connections through which said bolsters are carried by said sills, said connections being interposed at each and every connection between the bolsters and sills and comprising housings applied to said sills and holding blocks of cushion material, and members applied to said bolsters and engaged with said blocks so as to secure cushioned support against stresses up and down and laterally.

3. In a vehicle tank body, the combination of transverse bolsters carrying the tank, longitudinal sills forming part of the body, and cushion connections interposed between said bolsters and sills, said connections comprising housings applied to said sills and holding blocks of cushion material, and members applied to said bolsters and engaged with said blocks so as to secure cushioned support against stresses up and down and laterally.

4. In a vehicle tank body, the combination of transverse bolsters carrying the tank, longitudinal sills forming part of the body, and cushion connections through which said bolsters are individually carried by said sills, said cushion connections comprising housings applied to said sills and holding blocks of cushion material, and members applied to said bolsters and engaged with said blocks so as to secure cushioned support against stresses up and down and laterally.

5. In a vehicle body, the combination of transverse bolsters carrying the body, longitudinal sills forming part of the body, and cushion connections through which said bolsters are individually carried by said sills, said cushion connections being interposed between the several bolsters and the sills at a number of points distributed lengthwise of each side of the body.

PAUL S. SHIELD.